(12) United States Patent
Gallagher et al.

(10) Patent No.: US 9,191,405 B2
(45) Date of Patent: Nov. 17, 2015

(54) DYNAMIC CROSS-SITE REQUEST FORGERY PROTECTION IN A WEB-BASED CLIENT APPLICATION

(75) Inventors: Thomas Patrick Gallagher, Redmond, WA (US); Venkataramann Renganathan, Sammamish, WA (US); Brian Thomas Carver, Kirkland, WA (US); Muhammed Serdar Soran, Seattle, WA (US); Matthew Michael Swann, Bothell, WA (US); Trace David Ferrier, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/360,816

(22) Filed: Jan. 30, 2012

(65) Prior Publication Data
US 2013/0198294 A1    Aug. 1, 2013

(51) Int. Cl.
*H04L 29/06* (2006.01)
*H04W 12/06* (2009.01)

(52) U.S. Cl.
CPC .............. *H04L 63/145* (2013.01); *H04L 63/08* (2013.01); *H04L 63/0807* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 5,907,621 A | 5/1999 | Bachman et al. | |
| 6,058,193 A | 5/2000 | Cordery et al. | |
| 6,173,400 B1 * | 1/2001 | Perlman et al. | 713/172 |
| 6,189,096 B1 | 2/2001 | Haverty | |
| 6,223,287 B1 | 4/2001 | Douglas et al. | |
| 6,339,423 B1 | 1/2002 | Sampson et al. | |
| 6,360,254 B1 | 3/2002 | Linden et al. | |
| 6,393,468 B1 | 5/2002 | McGee | |
| 6,424,718 B1 | 7/2002 | Holloway | |
| 6,587,867 B1 | 7/2003 | Miller et al. | |
| 6,643,672 B1 | 11/2003 | Lebel | |
| 6,718,328 B1 | 4/2004 | Norris | |
| 6,795,554 B2 | 9/2004 | Farkas et al. | |
| 7,010,582 B1 | 3/2006 | Cheng et al. | |
| 7,222,363 B2 | 5/2007 | Rice et al. | |
| 7,237,024 B2 * | 6/2007 | Toomey | 709/224 |
| 7,418,401 B2 | 8/2008 | Bogasky et al. | |
| 7,475,240 B2 | 1/2009 | Shah et al. | |

(Continued)

OTHER PUBLICATIONS

Bryan Sullivan, Protect Your Site With URL Rewriting, Mar. 2008, MSDN Magazine.*

(Continued)

*Primary Examiner* — Ninos Donabed
(74) *Attorney, Agent, or Firm* — Steve Crocker; Danielle Johnston-Holmes; Micky Minhas (57) ABSTRACT

A canary value is used to validate a message from a non-web browser client application to a web server providing web services to mitigate cross-site forgery attacks. The canary value is generated by the server in party by applying a hash function to a user identifier and a time stamp. The server provides the canary value to the client application in response to receiving a message that does not have a canary or has an expired canary. The client application upon receiving an error message with a canary message will resend the prior message with the canary value present. The client application caches the canary value for subsequent messages until a new canary value is received. The canary value allows the server to ignore messages generated by the client application under control of an attacker.

15 Claims, 6 Drawing Sheets

(56) References Cited

U.S. PATENT DOCUMENTS

| | | | |
|---|---|---|---|
| 7,496,953 B2 | 2/2009 | Andreev et al. | |
| 7,500,099 B1* | 3/2009 | McElwee et al. | 713/168 |
| 7,500,262 B1 | 3/2009 | Sanin et al. | |
| 7,577,752 B2 | 8/2009 | Kimura | |
| 7,610,617 B2 | 10/2009 | Kelly et al. | |
| 7,613,205 B1* | 11/2009 | Chen | 370/450 |
| 7,665,127 B1 | 2/2010 | Rao et al. | |
| 7,673,135 B2 | 3/2010 | Chin et al. | |
| 7,734,527 B2 | 6/2010 | Uzo | |
| 7,921,226 B2 | 4/2011 | Mukherjee et al. | |
| 8,079,076 B2* | 12/2011 | Soin et al. | 726/12 |
| 8,424,073 B2 | 4/2013 | Sturms et al. | |
| 8,560,841 B2 | 10/2013 | Chin | |
| 8,578,462 B2 | 11/2013 | Petrovic | |
| 2002/0103936 A1 | 8/2002 | Jano et al. | |
| 2002/0143704 A1 | 10/2002 | Nassiri | |
| 2002/0161721 A1 | 10/2002 | Yuan et al. | |
| 2003/0182242 A1 | 9/2003 | Scott et al. | |
| 2003/0191964 A1 | 10/2003 | Satyavolu et al. | |
| 2003/0208562 A1 | 11/2003 | Hauck et al. | |
| 2004/0054966 A1 | 3/2004 | Busch et al. | |
| 2004/0078604 A1 | 4/2004 | Rice et al. | |
| 2004/0088349 A1 | 5/2004 | Beck et al. | |
| 2004/0237040 A1 | 11/2004 | Malkin et al. | |
| 2004/0243475 A1 | 12/2004 | Aronsson et al. | |
| 2004/0243852 A1 | 12/2004 | Rosenstein | |
| 2004/0250118 A1 | 12/2004 | Andreev et al. | |
| 2005/0021613 A1 | 1/2005 | Schmeidler et al. | |
| 2005/0044393 A1 | 2/2005 | Holdsworth | |
| 2005/0108625 A1 | 5/2005 | Bhogal et al. | |
| 2005/0132222 A1 | 6/2005 | Petrovic | |
| 2005/0138362 A1 | 6/2005 | Kelly et al. | |
| 2005/0144471 A1* | 6/2005 | Shupak et al. | 713/193 |
| 2005/0216582 A1* | 9/2005 | Toomey et al. | 709/224 |
| 2005/0229239 A1 | 10/2005 | Gray et al. | |
| 2005/0240864 A1 | 10/2005 | Leetaru et al. | |
| 2005/0278792 A1 | 12/2005 | Ramani et al. | |
| 2006/0020684 A1 | 1/2006 | Mukherjee et al. | |
| 2006/0031262 A1 | 2/2006 | Satoh et al. | |
| 2006/0064322 A1 | 3/2006 | Mascarenhas et al. | |
| 2006/0130131 A1 | 6/2006 | Pai et al. | |
| 2006/0212696 A1 | 9/2006 | Bustelo et al. | |
| 2006/0218391 A1 | 9/2006 | Glazer et al. | |
| 2006/0224397 A1 | 10/2006 | Morris et al. | |
| 2007/0006170 A1* | 1/2007 | Hasse et al. | 717/131 |
| 2007/0022473 A1 | 1/2007 | Hird | |
| 2007/0088740 A1 | 4/2007 | Davies et al. | |
| 2007/0136794 A1* | 6/2007 | Chin et al. | 726/5 |
| 2007/0143831 A1 | 6/2007 | Pearson et al. | |
| 2007/0150591 A1 | 6/2007 | Kimura | |
| 2007/0239800 A1 | 10/2007 | Eberlein | |
| 2008/0115201 A1* | 5/2008 | Sturms et al. | 726/9 |
| 2008/0127323 A1* | 5/2008 | Soin et al. | 726/12 |
| 2008/0222736 A1* | 9/2008 | Boodaei et al. | 726/27 |
| 2008/0263650 A1* | 10/2008 | Kerschbaum | 726/9 |
| 2008/0320567 A1* | 12/2008 | Shulman et al. | 726/4 |
| 2009/0019525 A1* | 1/2009 | Yu et al. | 726/3 |
| 2009/0076966 A1* | 3/2009 | Bishop et al. | 705/67 |
| 2009/0259512 A1* | 10/2009 | Larkins et al. | 705/9 |
| 2010/0161973 A1 | 6/2010 | Chin et al. | |
| 2010/0251345 A1* | 9/2010 | James et al. | 726/5 |
| 2010/0299732 A1* | 11/2010 | Zhang et al. | 726/6 |
| 2011/0131416 A1 | 6/2011 | Schneider | |
| 2011/0131635 A1 | 6/2011 | Schneider | |
| 2011/0154473 A1 | 6/2011 | Anderson et al. | |
| 2011/0225234 A1 | 9/2011 | Amit et al. | |
| 2012/0131326 A1* | 5/2012 | Lau et al. | 713/150 |
| 2012/0297485 A1* | 11/2012 | Maeda et al. | 726/23 |
| 2014/0047522 A1 | 2/2014 | Chin et al. | |

OTHER PUBLICATIONS

Sooel Son, Prevent Cross-site Request Forgery: PCRF, University of Texas, Austin, 2010.*

.NET Passport Security Framework, CPSC 328, Spring 2009.*

"Cross Site Request Forgery Protection", Retrieved Nov. 14, 2011 at <<https://docs.djangoproject.com/en/dev/ref/contrib/csrf/>> pp. 8.

Jovanovic, et al., "Preventing Cross Site Request Forgery Attacks", Sep. 1, 2006 Retrieved at <<http://ieeexplore.ieee.org/stamp/stamp.jsp?tp=&arnumber=4198791>>, In the proceedings of Securecomm and Workshops, IEEE, Baltimore, p. 10.

Maes, et al., "Browser Protection Against Cross-Site Request Forgery", Nov. 9, 2009, Retrieved at <<http://people.cs.kuleuven.be/~lieven.desmet/research/publications/docs/secu09.pdf>> in the proceedings of First ACM workshop on Secure Execution of Untrusted Code, p. 8.

U.S. Official Action dated Nov. 14, 2006 in U.S. Appl. No. 10/440,375.

U.S. Official Action dated Apr. 13, 2007 in U.S. Appl. No. 10/440,375.

U.S. Official Action dated Sep. 28, 2007 in U.S. Appl. No. 10/440,375.

U.S. Official Action dated Mar. 13, 2008 in U.S. Appl. No. 10/440,375.

U.S. Notice of Allowance dated Aug. 4, 2008 in U.S. Appl. No. 10/440,375.

Fu et al., "Dos and Donts of Client Authentication on the Web", Aug. 13-17, 2001, retrieved Oct. 7, 2006 from http:://www.usenix.org/publications/library/proceedings/sec01/fu/fu_html, 26 pp.

Chang, Dar-Jen, "Web Database Interface and Active Server Pages (ASP)," Sep. 16, 2003, retrieved Oct. 8, 2008 from http//:www.louisville.edu/~djchan01/cecs640/ASP1.pdf#search=%22Automatic%20%22page%2Ovalidation%22%20token%20%22, 40 pp.

Artix Security Guide, Version 2.0, Mar. 2004, INOA Technologies, retrieved Oct. 7, 2008 from http//iona.com.support/docs/artix/2.0/security_guide/security_guide.pdf, 367 pp.

U.S. Notice of Allowance dated Oct. 31, 2008 in U.S. Appl. No. 10/440,375.

U.S. Office Action dated Apr. 7, 2009 in U.S. Appl. No. 11/297,285.

U.S. Notice of Allowance dated Nov. 16, 2009 in U.S. Appl. No. 11/297,285.

U.S. Office Action dated Aug. 2, 2011 in U.S. Appl. No. 12/715,204.

U.S. Office Action dated Feb. 6, 2012 in U.S. Appl. No. 12/715,204.

U.S. Office Action dated Jan. 29, 2013 in U.S. Appl. No. 12/715,204.

U.S. Notice of Allowance dated Jun. 6, 2013 in U.S. Appl. No. 12/715,204.

U.S. Office Action dated Dec. 4, 2009 in U.S. Appl. No. 11/598,392.

U.S. Office Action dated Jun. 9, 2010 in U.S. Appl. No. 11/598,392.

U.S. Office Action dated Jan. 31, 2011 in U.S. Appl. No. 11/598,392.

U.S. Office Action dated Aug. 17, 2011 in U.S. Appl. No. 11/598,392.

U.S. Notice of Allowance dated Mar. 14, 2012 in U.S. Appl. No. 11/598,392.

U.S. Notice of Allowance dated May 8, 2012 in U.S. Appl. No. 11/598,392.

U.S. Notice of Allowance dated Jul. 24, 2012 in U.S. Appl. No. 11/598,392.

U.S. Notice of Allowance dated Dec. 6, 2012 in U.S. Appl. No. 11/598,392.

Office Action from the U.S. Patent and Trademark Office for U.S. Appl. No. 14/054,642, mailed Oct. 23, 2014, 10 pages.

Office Action from the U.S. Patent and Trademark Office for U.S. Appl. No. 14/054,642, mailed May 15, 2015, 12 pages.

* cited by examiner

DYNAMIC CROSS-SITE REQUEST FORGERY PROTECTION IN A WEB-BASED CLIENT APPLICATION

BACKGROUND

Internet based communications frequently involve a client application executing on a user's computer interacting with an application executing on a remote server. One common example is a user accessing a remote website, which involves using a suite of web-based protocols. These web-based protocols can also be used for accessing web-based services hosted by servers, but which do not involve accessing a website.

The ubiquitous access afforded by the Internet also affords the possibility of malicious intervention by other users. Various methods are known for a nefarious entity (termed an "attacker" herein) to initiate attacks over the Internet. An attacker may send a virus to infect a computer, copy or delete data from a computer, or otherwise obtain information stored in a computer. The computer may be the client computer or the server computer. Other attacks may slow down the processing capabilities of the computer or otherwise create malicious actions.

One form of attack involves the attacker using malicious Javascript® code on a web page to cause the client computer to send a legitimate message to a legitimate website. The user may be a customer of the business operating the website, and the website itself is what it purports to be. The message sent from the user's computer to the website is, by itself, conventional in form. In other words, the website does not detect any abnormal formatting or requests in the received message. However, the user may not have known that the message to the website was sent. The malicious action is causing the client computer to send the message to the website. The message could have instructed the website, for example, to delete user files, delete information at the website, or transfer money out of the user's account. This presumes that the web server provides document management services, website hosting services, or banking services, respectively.

It is with respect to these and other considerations that the disclosure made herein is presented.

SUMMARY

Concepts and technologies are described herein for providing protection against cross-site request forgery attempts. A cross-site request forgery involves causing a client application to send a message to a web server that the user did not intend to send. A nonce value called a "canary" is provided by the server to the client application for use in subsequent requests. The presence of the canary indicates to the server that the request originated from a page in the same domain, e.g., it did not originate due to a cross-site forgery request.

In one embodiment disclosed, a computer implemented method for processing a message from a server includes the operations of transmitting a request message to the server from a client application and receiving a response message from the server, wherein the response message includes a canary value. The method further includes the operations of caching the canary value in a memory and retransmitting the request message to the server with the canary value.

In another embodiment disclosed, a computer readable medium stores instructions that when executed cause a processor to transmit a request message comprising a user identifier to the server from a client application. The instructions further cause the processor to receive a response message from the server, wherein the response message include a canary value based in part on the user identifier. The instructions further cause the processor to cache the canary value in a memory and retransmit the request message to the server with the canary value.

In yet another embodiment disclosed, a system for generating a message to a web server includes a memory configured to store a canary value and an interface for exchanging messages with the web server. The system further includes a processor configured to transmit request message to the server from a client application using the interface, wherein the request message includes a user identifier. The processor is further configured to receive a response message from the server, wherein the response message includes a canary value based in part on the user identifier. The processor is further configured to cache the canary value in the memory and retransmit the request message to the server with the canary value.

This Summary is provided to introduce a selection of concepts in a simplified form that are further described below in the Detailed Description. This Summary is not intended to identify key features or essential features of the claimed subject matter, not is it intended that this Summary be used to limit the scope of the claimed subject matter. Furthermore, the claimed subject matter is not limited to implementations that solve any or all disadvantages noted in any part of this disclosure.

DETAILED DESCRIPTION

In the following detailed description, references are made to the accompanying drawings that form a part hereof, and which are shown by way of illustration of specific embodiments or examples. In the drawings, like numerals represent like elements throughout the several figures. Technologies will be presented pertaining to providing dynamic cross-site forgery protection to a non-browser web client.

The following detailed description is directed to preventing a certain form of web-based attack, which can occur in a web service context. In general terms, there are three actors involved. The first actor is a user operating a client computing device, such as a personal computer, laptop, or tablet computer, connected to the Internet. Reference to the "user" generally refers to a person, such as the person operating the client computer. Reference to the "client application" (or simply "client") refers to an application executing on the user's computer. Because the user, user's computer, and client application are so closely associated, these may be interchangeably' used at a high level and all refer to the first actor.

The second actor involves a server (a.k.a. web server) providing a web service of some sort. While the server is not an active participant in perpetuating the attack, it is a necessary party in the attack. Finally, the third and last actor is a computer connected to the Internet that initiates the attacks and which is generally termed herein as the "attacker."

The general nature of the attack is to somehow cause the client application to send a message to the server, which has not, in fact, been initiated by the user. The type of attack addressed herein is due to malicious web sites on a different domain from the legitimate server forging the request. In many instances, the user is not even aware that the message has been sent by their computer to the web server. Because the message sent by the client application is properly formatted, the server views such messages as proper messages originating from the client application. Hence, such messages are viewed as "legitimate" and the server generally will execute the commands indicated by these messages. The concepts and technologies disclosed herein, however, do not protect against other forms of malware which when loaded into the computer cause a request to be generated without accessing a malicious web site.

The nefarious aspect comes into play if the message generated from the client computer is not intended to be generated by the user. The attacker may be able to cause the client application to transmit a message that performs a malicious action, such as erasing the user's files at the server, transferring money at the server from the user's account to a third party account, sending an email containing a file with confidential information from the server, etc. In summary, the attack involves a message originating from the client computer that performs some action at the server that the user did not intend to perform. The server receiving the message thinks that the user directed their computer to have the client application originate the message in a legitimate manner. Without having further information to distinguish such messages, the server interprets the message as legitimate.

Figure 1:
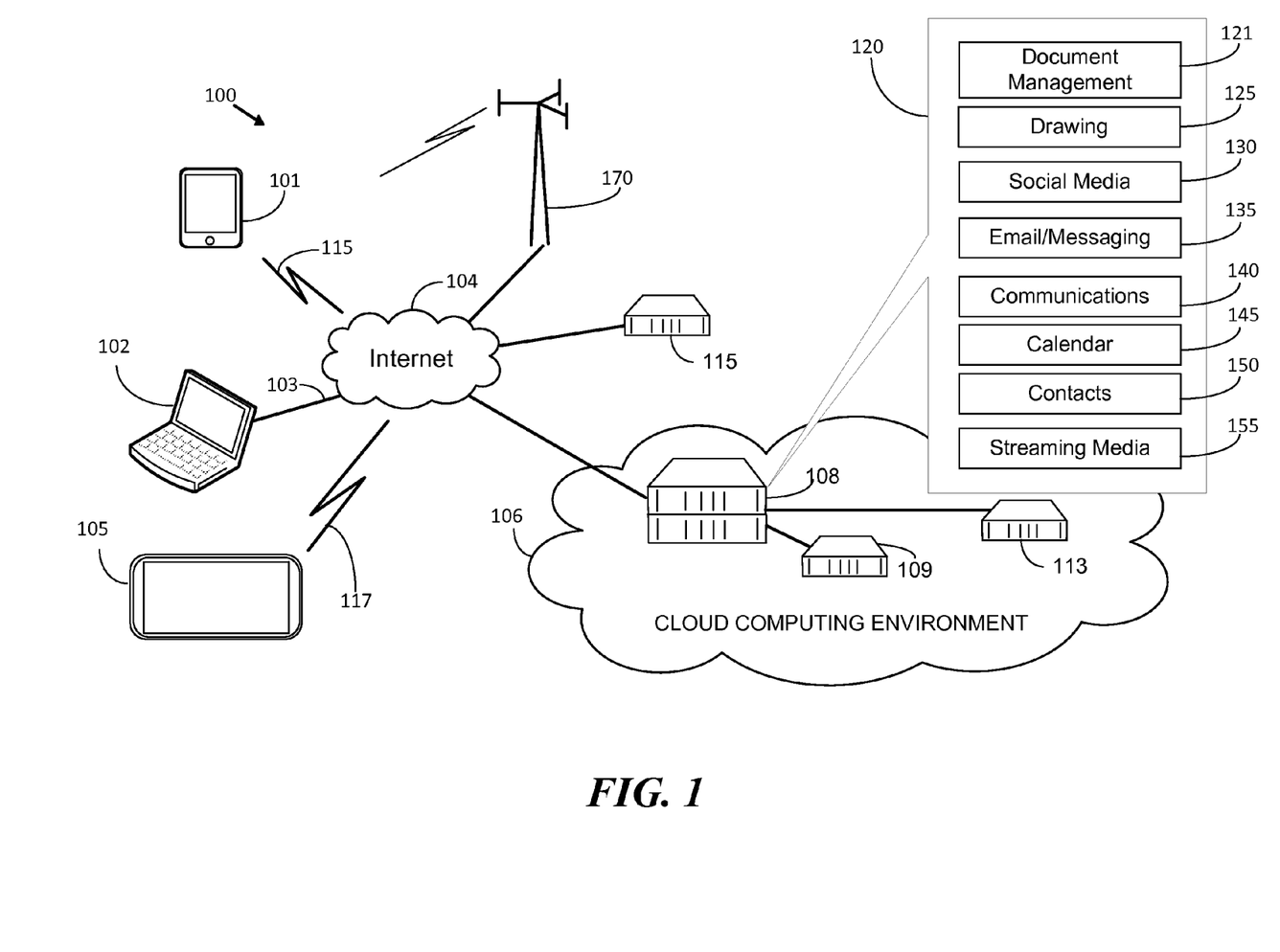
FIG. 1 illustrates one environment of user computing devices interacting with a web server according to one embodiment presented herein.

Turning now to the figures, one context for applying the technologies disclosed herein is shown in the system illustration 100 of FIG. 1. In FIG. 1, the user could be using various types of computing devices executing a client application and communicating with a server. The computing devices could be a smartphone 101, a laptop computer 102, or a tablet computing device 105. The concepts are not limited to using only these types of computing devices, as the concepts can be used by other types of computing devices, including desktop computers and other types of devices known to those skilled in the art.

The computing devices may utilize wireless connections 115, 117, for transferring data for interacting with servers located a cloud computing environment 106. The data from the computing devices are conveyed in one embodiment by the Internet 104 to the cloud computer environment 106 and can he based on various readily available technologies, including various cellular based technologies (CDMA, GSM, 4G, EDGE, originating from cellular infrastructure 170 provided by a cellular service provider. Other wireless technologies (e.g., WiMax, WiFi, etc.) could be used. Wired technologies could be used and may be based on ISDN, cable modems, DSL, and other well-known technologies.

The connectivity afforded by the wired 103 and wireless 115, 117, communications through the Internet 104 provides the computing devices with access to servers 108 in the cloud computing environment 106. Other configurations are possible. Although the concepts illustrated herein may refer to a single server 108, there may be various servers and configurations involved in the cloud computing environment 106. For example, one server 108 accessed by a device may, in turn, access another server 113. A plurality of servers may be used in another embodiment in order to provide the services disclosed herein.

The server 108 may execute various application programs 120. These may be executed in a shared or distributed mariner across one or more servers with a client in the computing devices 101, 102, or 105. The application programs 120 may include a document management application 121 used to provide document management services. The document management services may allow the user to save a created or retrieved document in the server 108, and control access by others. One such product for providing such document management capabilities is the SHAREPOINT® product available from Microsoft® Corporation, which may operate in conjunction with other applications executing in the computing device, such as WORD®, also available from Microsoft® Corporation.

The application programs 120 may include other types of applications, such as a drawing application 125 for creating and editing graphical oriented programs. Applications for editing images, video etc, may also be considered with the scope of the drawing application.

Other applications executing on the server 108 may include social media applications 130 for group related messaging and communications. Another application program present may be an email/messaging application 135 that is involved in various messaging capabilities, including instant messaging. A communications application 140 may allow for video chat or voice communication. A calendar application 145 may allow for organizing meetings and events. A contacts application 150 may allow for organizing contact information for the user and/or individuals associated with an enterprise. A streaming media application 155 may provide for streaming digital data, such as audio or video files. Each of these applications may store data, which server 108 may maintain in a data store 109 in the cloud computing environment 106.

Each of the applications 120 may interact with a client application executing in the computing devices 101, 102, and 105. Various communication protocols may be used over the Internet 104 between the computing devices and the server 108. In one embodiment, these protocols may be HTTP based protocols which are used in providing server based services to the client application.

The attacker may be a web based server 115 that is also connected to the Internet 104. The attacker server 115 may comprise one or more servers located remotely. Typically, the attacker is not part of the cloud computing environment 106 that hosts the server 108 providing services associated with the various applications 120. The attacker server 115 may not be located within the same country as the user.

Figure 2:
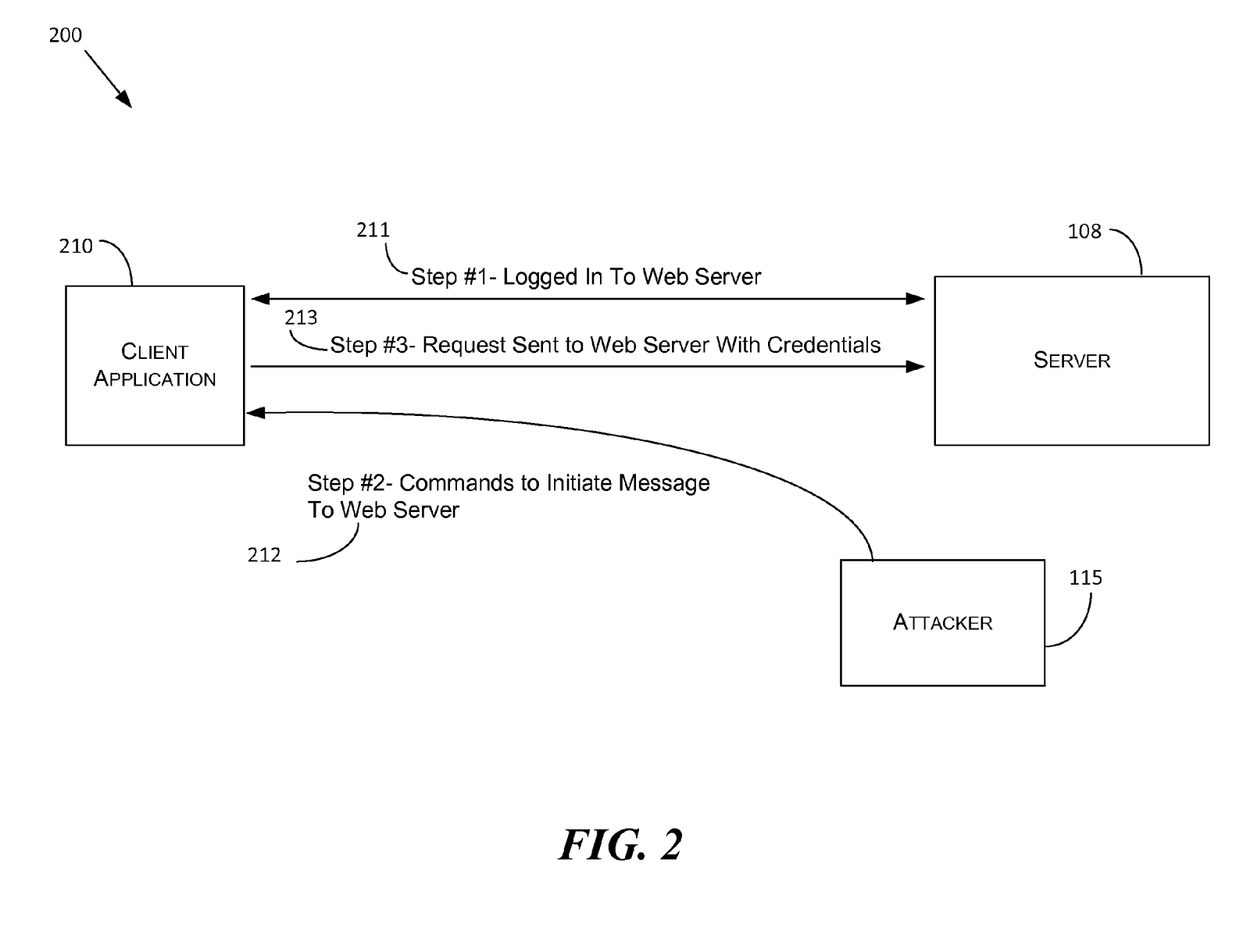
FIG. 2 is a schematic diagram depicting a client application, a web server, and art attacker.

The nature of the attack is shown in FIG. 2. FIG. 2 illustrates the environment 200 for the attack to occur. A client application 210 is executing in the user's computer, and may be connected to the Internet snot shown in FIG. 2). A server 108, which provides legitimate web services, is accessed by the user. In one case, the server 108 may host a web service for managing documents, such as storing and retrieving the user's confidential memos or business plans. The attacker server 115 is also connected to the Internet.

In one form of cross-site forgery request, the client application 210 issues requests for managing documents. This may be a request to save, retrieve, or edit a document. The client application 210 may have, for example, in Step #1, logged into the server 108 for receiving document management services 211. Logging into the server 108 may have involved the client application previously transmitting credentials to the server 108 to properly authenticate itself. After authentication, the client application may identify itself via a user name or other form of user identifier.

It can be assumed that at some point after the user has logged on to the server 108 and has been authenticated, an attacker 115 sends an email with a link contained therein to the client application 210. The user may open the email and click on the link. This is represented by Step # 2 where commands are received by the client application for initiating a request to the web server 212. In another example, the attacker 115 may provide a website that promises useful information by clicking on a link offered to the user. The link may promise, for example, valuable information, coupons, free offers, etc. In either scenario, when the user opens the email or selects the link, the attacker server sends malicious computer code, such as HTML and Javascript®, to the client application 210. The malicious code then causes the client application to send a HTTP based message in Step #3 213. Because the user had previously logged onto the server 108 and had been previously authenticated, the request sent in Step #3 may indicates to the web server 108 the proper user credentials or user identification.

The request 213 may be a message that includes the appropriate cookies, user identification, or other credentials to allow the server 108 to recognize the user. Without further information, the server 108 cannot readily distinguish this request from any other request originating from the client application. The request and associated data may be sent by the client application without the user being aware of this occurring. In an extreme illustration of the potential malicious consequences, the request may have requested a web service banking application to transfer money from the user's account to a specified offshore account.

Mechanisms for addressing such forgery request when the server 108 provides a web-site have been identified, and include, for example, those concepts disclosed in U.S. Pat. No. 7,500,099, entitled, Method for Mitigating Web-Based 'One-Click' Attacks, the contents of which are incorporated by reference. This approach may be applicable for certain HTTP based messages, such as an HTTP POST message.

However, a non-browser based client application 210 may require a different mechanism to prevent such attacks. Some non-browser based client applications may use communication protocols such as the simple object access protocol ("SOAP"). While SOAP is also conveyed by HTTP and is a web-protocol, this is distinguished from HTTP POST operations. Further, SOAP is not required for viewing a website, so that solutions addressing cross-site attacks involving a web browser would not necessarily cover using SOAP.

Returning to FIG. 2, a client application 210 may use, for example, a SOAP protocol to initiate a request, such as illustrated by in Step #3 213 without having established an immediate prior dialog, such as indicated by Step #1. Thus, in this example, the SOAP request may include any required user credentials for establishing authorization to the server 108. In this type of scenario, it may be very difficult for the server 108 to distinguish from a legitimate request that occurs in response to a user action as compared to a request that occurs in response to an attacker completing Step #2.

Figure 3:
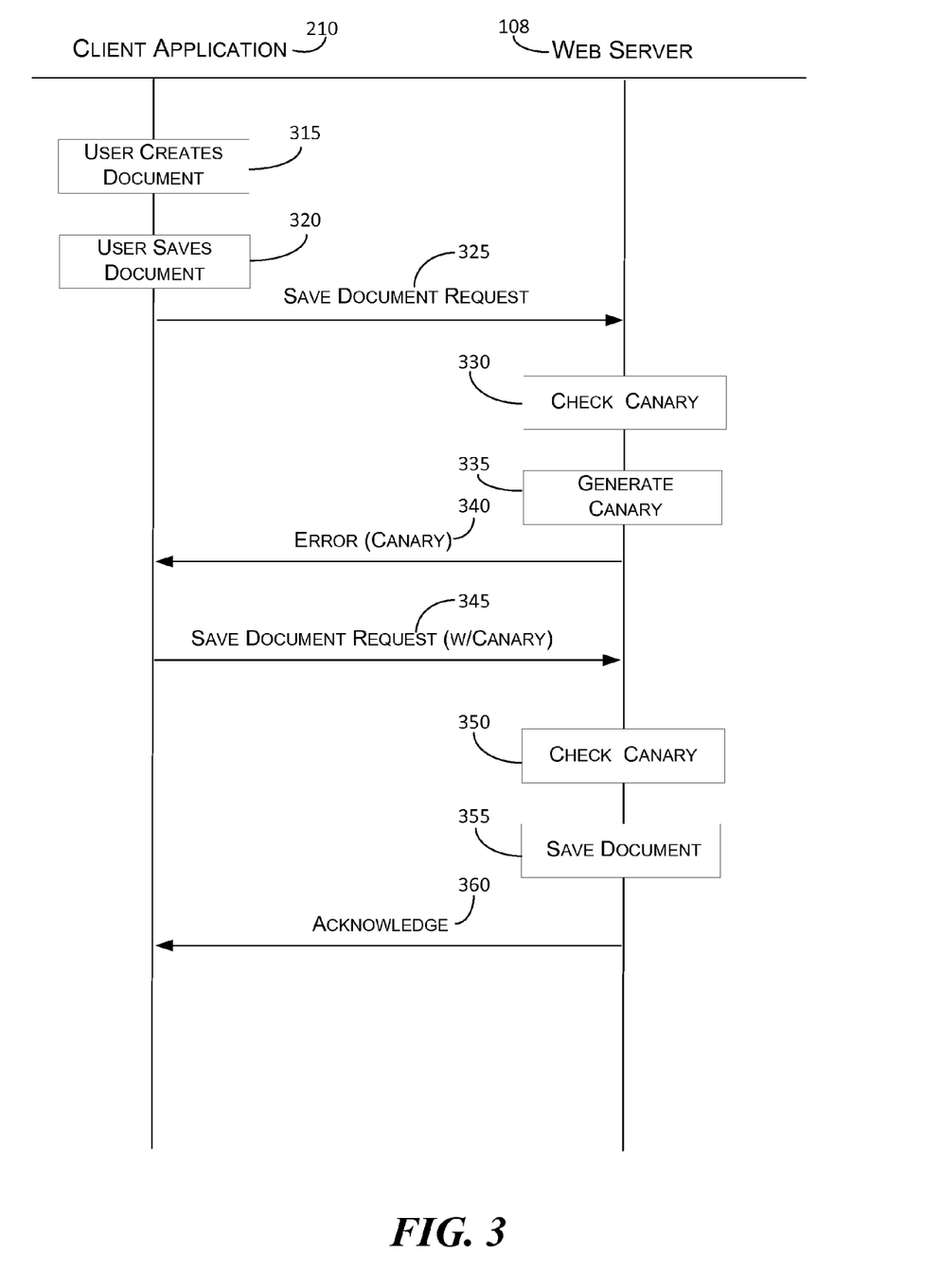
FIG. 3 is a messaging diagram illustrating the interaction between the client application and the web server.

FIG. 3 illustrates a mechanism for foiling this type of attack. This approach involves using a dynamically assigned security nonce, called a canary. The server uses the canary to ascertain that the received message properly originated from the client application and was not the result of a cross-site request forgery attack. FIG. 3 illustrates a client application 210 and the web server 108 as two entities that exchange messages and process information in response to the exchanged messages.

Continuing with the illustration of a web-based document management service, the first action may involve the user creating a document in their computing device in operation 315. The user may be using an appropriate application executing in a laptop, PC, tablet computing device, or other processing device. In another embodiment, the user may be editing a document, such as a text document. The creation of the document may occur without having previously established any type of communication with the web server 108. Thus, the user may create the document locally on the computing device without having logged onto the server.

After creating the document in operation 315, the user may request to the web server to save the document in operation 320. At this point, the client application must interact with the server. This save operation 320 requests the web service provided by the server 108 for providing document storage. The web service may provide, for example, storing of the document, sharing of the document with others (e.g., allowing access to others), or encryption of the document. At this point, the client application 210 interacting with the web server may initiate a message 325 requesting to save the document. This message could be, for example, in the aforementioned SOAP protocol, but other protocols may be used. The save document request message 325 may include the file to be saved (not shown in FIG. 3) and any requisite user identification (also not shown).

The save document request message 325 may be the first message sent by the client application 210 to the web server 108. The web server 108 receives the message, and processes it to determine whether the canary is present. The canary is generated by the web server and assigned to the client application, which ensures to the web server that the request originated from the client. Because the save document request message 325 is the first message sent by the client application, it will not have the canary value in it.

As expected, in operation 330, the web server 108 processes the request message 325 to check the canary's value. Since there is no canary in the request, the canary check operation 330 fails. In operation 335, the web server generates a new canary value for the user. In general, whenever the server 108 ascertains a missing or invalid canary value, it generates a new canary value.

In one embodiment, the canary value may be generated based on three different pieces of information. First, a form of user identification may have been provided in the save document request message 325. This could have been for example, a user ID, a login value and include other secret information, such as a password. Any information that uniquely identifies the user may be used. Second, a time value at which the request was made (e.g., a time stamp) may be used in generating the canary value. This same time value may be appended to the canary value to allow validation of the canary value, as will be seen. Third, a secret hash function that is known to the server is used to generate the canary value. Based on this information, the web server is able to generate a unique canary value for the user at different times. Thus, the same user at different times will receive a different canary value. In some embodiments, the hash value of the combined username and time stamp is generated, and the result is then further appended with the time stamp value. This allows the time stamp value to be extracted, and the same canary value can be regenerated by using the same user identifier, time stamp, and same hash function.

In one embodiment, the web server 108 then returns the canary value in an ERROR message 340. This ERROR message 340 is returned because the save request 325 did not include the proper canary value. The ERROR message 340 further includes the newly generated canary value that is transmitted to the client application. At this point, the client application is now in a position to resubmit the prior message request with a valid canary value. Other embodiments may use other types or fours of messages to return the canary value.

As shown in FIG. 3, after receiving the error message 340, the client application re-sends the save document request message 345 with the just-received canary value. The resent save document request 345 is received by the web server 108. Again, the web server 108 performs the identical check canary processing in operation 350 as it did in operation 330. However, the result of the check canary operation 350 this time indicates the canary is valid. In one embodiment, the check canary operation 350 involves the web server regenerating the canary value for the user to determine if the canary value is correct. The server 108 can apply the same hash algorithm used to generate the canary initially.

Presuming that the canary value received from the client application in message 345 matches the canary value generated by the web server 108 in operation 350, the web server now knows that the message properly originated from a valid client application. The request operation, in this case a save document request, is then performed in operation 355. An acknowledgement message 360 may, be returned to the client application 210. However, this aspect is not required by the canary processing procedures.

The canary guards against the server 108 from acting on a request sent from the client application to the server 108 because of an attacker's malicious code. For example, assume that the attacker's email link causes a script to run in the client application that causes a "Delete File" message to be issued by the client application to the web server. This message is generated at the behest of the attacker and sent to the server 108. The attacker would not know the correct canary value to use in the request.

Two possible outcomes are possible in regard to the request message initiated because of the malicious code from the attacker. First the attacker could cause the client application to send a "Delete File" message without a canary. However, as described previously, anytime a message. such as "Delete File," is sent without canary, it will be rejected by the web server 108. In this case, the message processing by the server is very similar to the "save documents" message 325 shown in FIG. 3 that did not have a canary value. Thus, to the extent that the attacker is causing messages to be initiated by the client application without a canary, the messages will not be acted upon by the server 108.

The second possibility is that the attacker could have the client application send a message and provide a canary value to be used. The attacker is not able to read any canary value previously received by the client application. This is because the malicious code in one domain cannot read values of another domain. This is sometimes referred to as the "same-origin policy," which precludes reading values across domains. At best, the attacker must guess at its value and direct the client application to use the guessed value. Any guess at the canary value by the attacker would likely not be an incorrect canary value. The hash function can be designed to decrease the likelihood of a successful guess to a very low probability. Further, increasing the granularity of the time stamp appended to the hash output further lessens the likelihood of guessing the canary value.

If the "Delete File" request is sent by the client application without a canary, the web server will not act upon the message, but the web server would return a canary value in the error message. The returned canary value is retained by the client application, but it is not transmitted to the attacker. Thus, the attacker would not know this canary value once it is returned to the client application, and it is not possible for the attacker to instruct the client application to use this value. Thus, it is presumed that the hacker does not have access to this information in the client application and cannot generate a second Delete File message instructing the client application to use the previously stored value. The principle sometimes called "same origin policy" prohibits one web server from reading contents of another. Thus, the attacker cannot read the canary provided to the client application as part of a legitimate exchange, nor can the attached read the value if returned in response to an attacker generated request. If this occurs, then it is indicative of a different type of security breach, which is outside the scope of this disclosure.

The client application may cache the canary value in memory. The canary value may be used on each subsequent message from the client application. The canary will be recognized by the web server as being acceptable as long as the canary value is valid in the server. In some embodiments, the server may allow a canary to expire 30 minutes after it was initially generated, in other words, the web server may limit any given canary to be valid for only 30 minutes after it was initially generated for the client application. After this time, the web server may reject any message with the old canary value and return an error message with the new canary value. The communication protocol in the client application will regenerate the message that was rejected, and use the new canary value. Although this will cause an otherwise valid message to be rejected, this would happen only once every 30 minutes, or at a rate of twice an hour.

After 30 minutes, the canary value may expire and a new value may be generated in the server and provided to the client application. To validate a canary received, the web server may regenerate the canary value for each message from each user. In other words, the web server is not required to cache each canary for each user, but can confirm its validity by first determining whether the time stamp has expired, and if not, then regenerating the canary for the user based on the username and time stamp, and determine whether the regenerated value and the received value are the same. If they are, then the message can be processed. If the canary received is not the same as the canary regenerated for that user, then the message will be rejected, and the server will return the new canary in an ERROR message.

Figure 4:
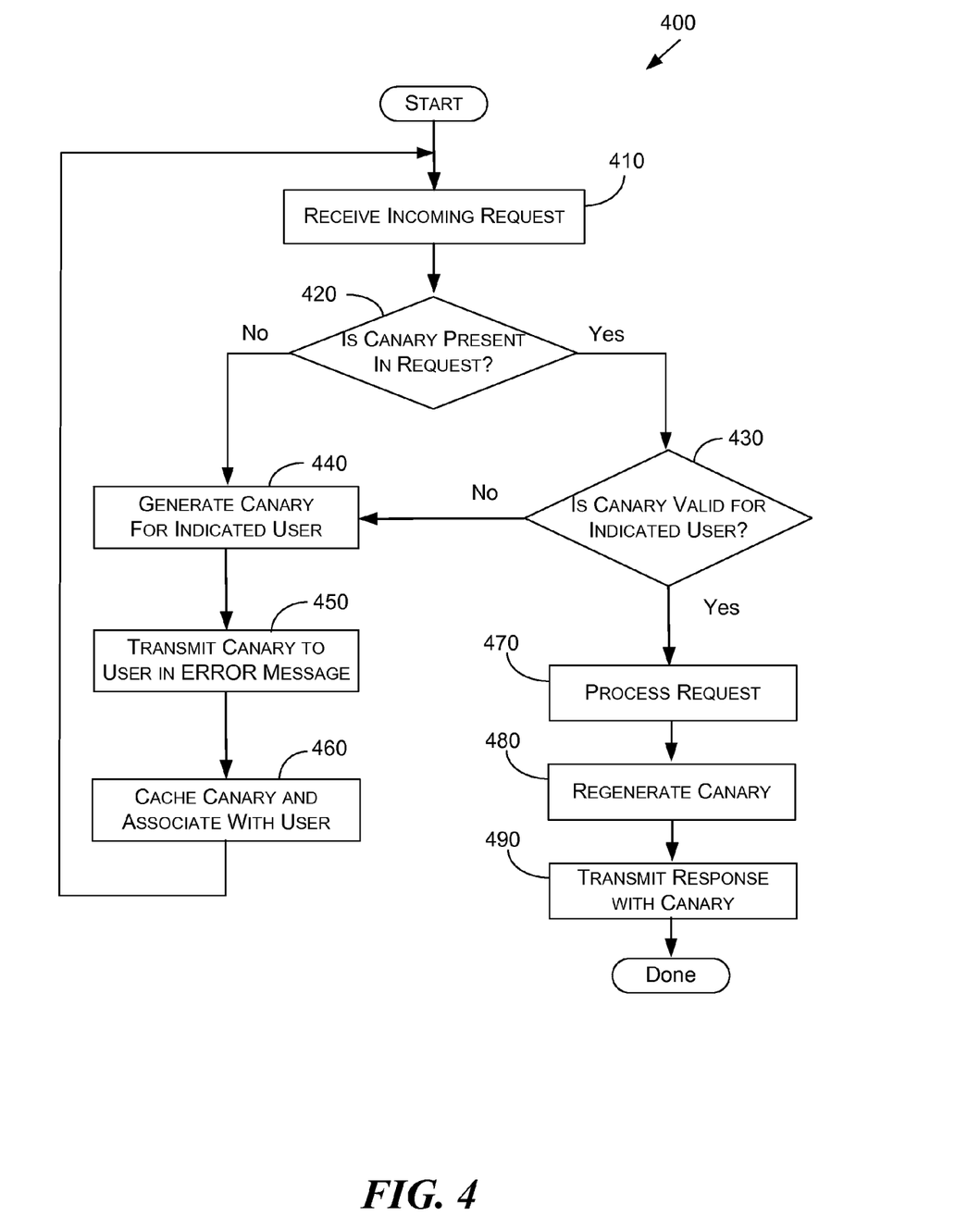
FIG. 4 is a process flow illustrating operations associated with processing messages associated with a canary in the web server.

The processing in the server and the client application with respect to the canary value are now reviewed. The process shown in FIG. 4 (as well as for FIGS. 5A and 5B) illustrates the various operations that may occur in order to process the canary. FIG. 4 illustrates the processing in the server. It should be appreciated that the logical operations described herein with respect to FIG. 4 and the other figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 4 and described herein. These operations may also be performed in a different order than those described herein.

The process 400 of FIG. 4 begins with the server receiving an incoming request in operation 410. The request could be for performing an action associated with a document, such as the aforementioned save function. Other functions may be indicated. In the case where the message was generated by an attacker, the message may be malicious, e.g., delete a file. The message may indicate the appropriate user identification and credentials, so that sufficient information is included to identify the user to the server.

In operation 420, the server determines whether a canary value is present in the request. If there is a canary value present, then the server next determines in operation 430 whether the value is valid for the identified user. The validation of the canary may be implemented in several ways. In one embodiment, the server could maintain a mapping table indicating for each user the associated canary value. Alternatively, the server could regenerate the canary for the user for each incoming message and determine if the regenerated value matches the value in the received message.

The server may also periodically replace the canary with a new value. Since the canary may be of a form that comprises a hash function applied to the user identifier and a time stamp, with the results concatenated with the time stamp, the canary can always be analyzed to determine when it was generated. This is accomplished simply by stripping of the time stamp portion and comparing the time stamp with the current time. If the different exceeds a defined time limit, which may be 30 minutes, the server may consider the canary to be invalid, and replace it with a newly generated value. Other embodiments may define the life of the canary to be shorter or longer.

Assuming that the canary value is present in operation 420 and validated for the user in operation 430, then in operation 470, the incoming message is processed as usual. In some embodiments, the server may then regenerate the canary value in operation 480. This canary value is includes in the response transmitted to the user in operation 490. Thus, in some embodiments, the server may generate the canary the for each response sent to the user, regardless of whether the response is an ERROR message or a normal response message. In other embodiments, the regenerating the canary shown in operation 480 may only occur at certain intervals. Thus, operation 480 is optional in some embodiments. The process 400 has completed at this point.

If there is no canary value present in the incoming message in operation 420, or if the canary value present in the incoming message is not validated in operation 430, then the server in operation 440 generates a new canary for the user. Note that if the server had generated a canary in operation 430, then this value could be used in lieu of regenerating the canary in operation 440. In other embodiments, a new canary may be generated and may be sent back on every response message from the server 108 (including an ERROR message). If so, it is possible that the time stamp will change, and thus, a different canary value would be generated.

Next, the server transmits the generated canary to the user in an ERROR message in operation 450. The ERROR message can be, for example, a 401 or 403 Status Code (a.k.a. error code). The caching of the canary and associating it with the user in operation 460 is optional. As noted above, some implementations in the server may not cache the canary, but merely generate a value each time as necessary. Thus, in some embodiments, operation 460 may be skipped in the server.

Figure 5A:
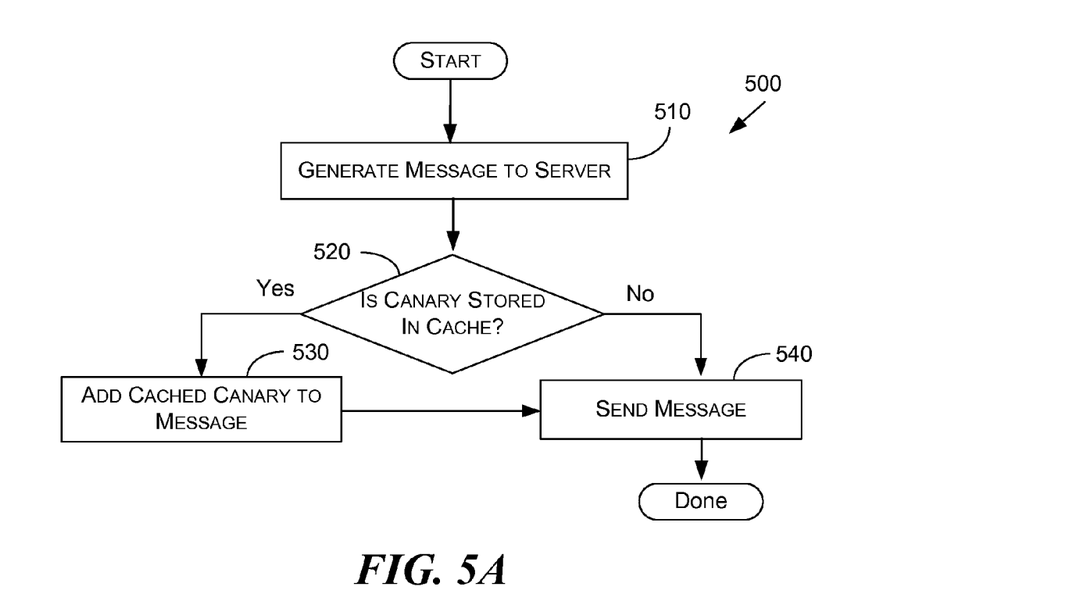
FIGS. 5A and 5B is a process flow illustrating operations associated with sending and receiving messages with a canary in the client application.
Figure 5B:
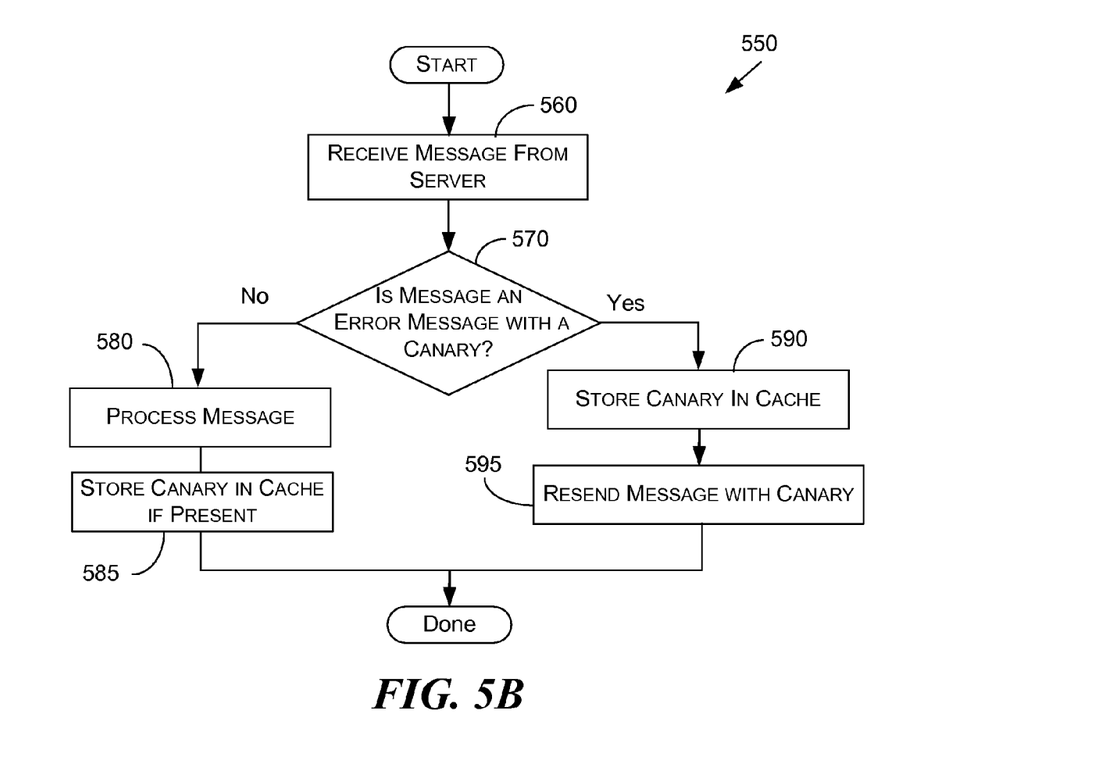

FIGS. 5A and 5B illustrate an embodiment of canary processing from the client application perspective. The process flow in FIG. 5A illustrates the process 500 for generating a message with a canary to the server. The process initiates with a determination that a message is to be generated to the server in operation 510. The particular basis for triggering the message may vary. Using the previously indicated document management illustration, this may occur when the user requests to save the document in the server.

In operation 520, a determination is made whether there is a canary stored in cache in the client computer. If there is a value stored in cache, then in operation 530 that value is incorporated into the message and then the message is sent to the server in operation 540. If there is no canary stored in cache memory 520, then the message is sent in operation 540, but without any canary value. The process 500 is complete at this point.

FIG. 5B illustrates the process flow 550 when the client application is receiving a response from the server 560. The client application determines in operation 570 whether an ERROR message is received with a canary. The presence of a canary in the ERROR message indicates that the previously sent message had an invalid canary, or was missing a canary. The ERROR message itself further indicates that the previously sent message was not acted upon by the server. Thus, if a canary is present in operation 570, then the canary value is then stored in cache in operation 590, and the previous message is resent in operation 595 with the canary. Alternatively, the process flow from FIG. 5A could be followed. If there is no canary determined to be present in operation 570, then the message is processed as normal in operation 580. The received message may contain a canary, and if does, then in operation 585 the canary value is stored in cache. As noted above, in some embodiments the server may return a canary value in each message (regardless of whether it is an ERROR message or normal response message). Thus, operation 585 may be optional in some embodiments. The process 550 is completed at this point, The client application does not know the hash function, or at least the secret value stored in the server used by the hash function, that is applied to the user identifier, and hence the client application cannot regenerate the canary. The client application needs to cache the canary value in memory, and incorporate the cached value into subsequent messages sent to the server. The client application may not know when the canary will expire, so the client application will continue using the canary until a new value is returned by the server. At that point in time, the old canary in cache memory is overwritten with the new canary value. If the server 108 returns a canary in each response message, then the client application may always store the received canary in cache. This means the client application will rarely use a "stale canary" when sending a request to the server 108.

The client application reflects the process 550 with respect to processing an ERROR message containing the canary code. The canary value could be returned in various types of ERROR messages from the server, such as a HTTP Status Codes in the 4XX series. Specifically, a Status Code 401 ("Unauthorized") may be used to convey the current or regenerated canary value to the client application. In other embodiments, a Status Code 403 ("Forbidden") may be used. Other embodiments may use other values.

Figure 6:
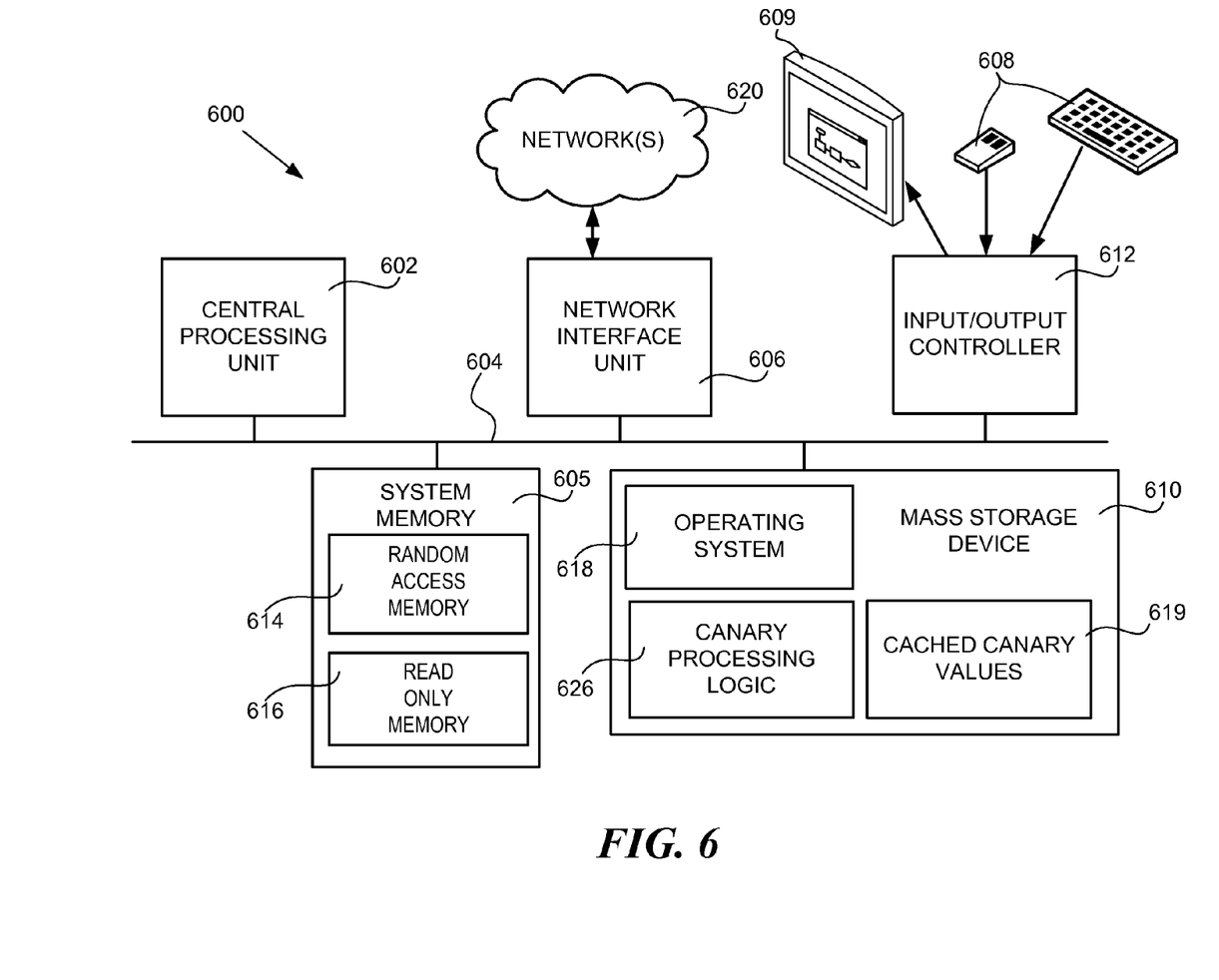
FIG. 6 illustrates a computer architecture of a computing device configured to provide canary processing operations.

The process flow described above and other related functions can be implemented in one embodiment by the computing architecture of a computer device 600 as shown in FIG. 6. FIG. 6 shows an illustrative computing architecture for a computing device capable of executing the processes described. Although FIG. 6 describes the computing device such as a smartphone 101, laptop 102, or tablet computer 105, the architecture shown in FIG. 6 may illustrate a server computer, desktop computer, or other type of computer utilized to execute any aspect of the software components presented herein. Other architectures or computers may be used to execute the software components presented herein.

The computer architecture shown in FIG. 6 includes a processor 602 (a.k.a. as a centralized processing unit or "CPU"), a system memory 605, including a random access memory 614 ("RAM") and a read-only memory ("ROM") 616, and a system bus 612 that couples the memory to the CPU 602. A basic input/output system containing the basic routines that help to transfer information between elements within the computing device 600, such as during startup, is stored in the ROM 616. The computing device 600 further includes a mass storage device 610 for storing an operating system 618, application programs, and other program modules, as described herein.

The mass storage device 610 is connected to the CPU 602 through a mass storage controller (not shown), which in turn is connected to the bus 612. The mass storage device 610 and its associated computer-readable media provide non-volatile storage for the computing device 600. Although the description of computer-readable media contained herein refers to a mass storage device, such as a hard disk or CD-ROM drive, it should be appreciated by those skilled in the art that computer-readable media can be any available computer storage media that can be accessed by the computing device 600.

It should be appreciated by those skilled in the art that computer-readable media may be any available media that can be accessed by the computing device 600, including computer-readable storage media and communications media. Communications media includes transitory signals. Computer-readable storage media includes, but is not limited to, RAM, ROM, EPROM, EEPROM, flash memory or other solid state memory technology, CD-ROM, digital versatile disks ("MID"), HD-DVD. BLU-RAY, or other optical storage, magnetic cassettes, magnetic tape, magnetic disk storage or other magnetic storage devices, or any other medium which can be used to store the desired information and which can be accessed by the computing device 600. However, the computer readable storage media does not encompass transitory signals.

According to various embodiments, the computing device 600 may operate in a networked environment using logical connections to remote computers or servers through a network (not shown in FIG. 6). The computing device 600 may connect to the network 620 using an antenna (not shown). In other embodiments, connection to other types of networks may be accomplished using an input/output controller 612. The input/output controller 612 can be used for receiving and processing input from a number of other devices 608, including a keyboard, mouse, or electronic stylus (not shown in FIG. 6). Similarly, an input/output controller 612 may provide output to a display screen 609, a printer, or other type of output device (also not shown in FIG. 6). In one embodiment, the computing device may incorporate a display screen 609 comprising a touch screen display. The touch screen display functions to not only display information, but also to receive input from the user, including inputting text, commands, and controls.

As mentioned briefly above, a number of program modules and data files may be stored in the mass storage device 610 and RAM 614 of the computing device 600, including an operating system 618 suitable for controlling the operation of a networked desktop, laptop, tablet or server computer. The mass storage device 610 and RAM 614 may also store one or more program modules or data tiles. In particular, the mass storage device 610 and the RAM 614 may store the canary processing logic 626. The mass storage device 610 and RAM 614 may also store cached canary values 619. The canary value is cached in the client computer, but may not be cached in the server computer. Recall that the server computer may regenerate the canary value as needed and thus avoiding caching.

It should be appreciated that the software components described herein may, when loaded into the processor 602 and executed, transform the processor 602 and the overall computing device 600 from a general-purpose computing system into a special-purpose computing system customized to facilitate the functionality presented herein. The processor 602 may be constructed from any number of transistors or other discrete circuit elements, which may individually or collectively assume any number of states. More specifically, the processor 602 may operate as a finite-state machine, in response to executable instructions contained within the software modules disclosed herein. These computer-executable instructions may transform the processor 602 by specifying how the processor 602 transitions between states, thereby transforming the transistors or other discrete hardware elements constituting the processor 602.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computing device 600 in order to store and execute the software components presented herein. It also should be appreciated that the computing device 600 may comprise other types of computing devices, including hand-held computers, embedded computer systems, personal digital assistants, and other types of computing devices known to those skilled in the art. It is also contemplated that the computing device 600 may not include all of the components shown in FIG. 6, may include other components that are not explicitly shown in FIG. 6, or may utilize an architecture completely different than that shown in FIG. 6.

Based on the foregoing, it should be appreciated that a client application that is subjected to a cross-site request forgery attack will result in the server not taking action on the message, but returning an ERROR message with a valid canary. Subsequent messages from the client application may include the canary, which will allow the server to act upon the message. The canary value is only provided to the client application and the attacker cannot read or otherwise command use of the canary value cached in the client computer when instructing the client application to generate a message. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A computer implemented method for processing a message from a server, comprising:
    transmitting a first request message comprising a user identifier and a canary value to the server from a client application by way of an interface for exchanging messages with the server, the canary value comprising a first part based on a hash value generated from the user identifier and a time stamp that is appended to a second part comprising the time stamp;
    receiving a response message from the server, the response message comprising a current canary value, based in part on the user identifier, and an error message;
    overwriting the canary value in a memory with the current canary value by way of the client application;
    retransmitting the first request message to the server with the current canary value, and
    transmitting a second request message different from the first request message using the current canary value received in the error message.

2. The computer implemented method of claim 1 wherein the error message comprises an HTTP Status Code 401 comprising the current canary value.

3. The computer implemented method of claim 1 wherein the server will not fulfill the request message if the request message does not include a valid canary value.

4. The computer implemented method of claim 1 wherein transmitting the first request message to the server from the client application is initiated by instructions sent by a third party.

5. The computer implemented method of claim 4 wherein the instructions are sent by a third party in an email message processed by a computer executing the client application.

6. The computer implemented method of claim 4 wherein the instructions are provided to the client application in response to selecting a link to a website.

7. The computer implemented method of claim 1 wherein the request message is a document management request.

8. A computer readable storage medium storing instructions which when executed cause a processor to:
    transmit a first request message comprising a user identifier and a canary value to the server from a client application using an interface for exchanging messages with the web server, the canary value comprising a first part based on a hash value generated from the user identifier and a time stamp that is appended to a second part comprising the time stamp;
    receive a response message from the server, the response message comprising a current canary value, based in part on the user identifier, and an error message;
    overwrite the canary value in a memory with the current canary value by way of the client application;
    retransmit the first request message to the server with the current canary value, and
    transmit a second request message different from the first request message using the current canary value received in the error message.

9. The computer readable storage medium of claim 8 wherein the error message is an HTTP Status Code 401 message comprising the current canary value.

10. The computer readable storage medium of claim 8 wherein the request message is a document management request.

11. The computer readable storage medium of claim 8 wherein the current canary value comprises a second time stamp value that is at least 30 minutes different from a value of the time stamp value.

12. The computer readable storage medium of claim 8 wherein transmitting a request message to the server is initiated by instructions sent by a third party.

13. A system for generating a message to a web server comprising:
    a memory configured to store a canary value comprising a first part based on a hash value generated from a user identifier and a time stamp that is appended to a second part comprising the time stamp;
    an interface for exchanging messages with the web server; and
    a processor configured to
        transmit a first request message to the server from a client application using the interface, the first request message comprising a user identifier and the canary value,
        receive a response message from the server, the response message comprising a current canary value, based in part on the user identifier, and an error message,
        overwrite the canary value in the memory with the current canary value by way of the client application,
        retransmit the first request message to the server with the current canary value, and
        transmit a second request message different from the first request message using the current canary value received in the error message.

14. The system of claim 13 wherein the request message is a document management request.

15. The system of claim 13 wherein transmitting a request message to the server from a client application is initiated by instructions sent by a third party.

* * * * *